Jan. 31, 1967 R. J. CUTA 3,300,952
AIR FILTER HAVING DUCTILE METAL FRAME WITH INTEGRAL LOCK
Original Filed July 13, 1962 2 Sheets-Sheet 1

INVENTOR.
ROBERT J CUTA
BY
Andrus & Starke
Attorneys

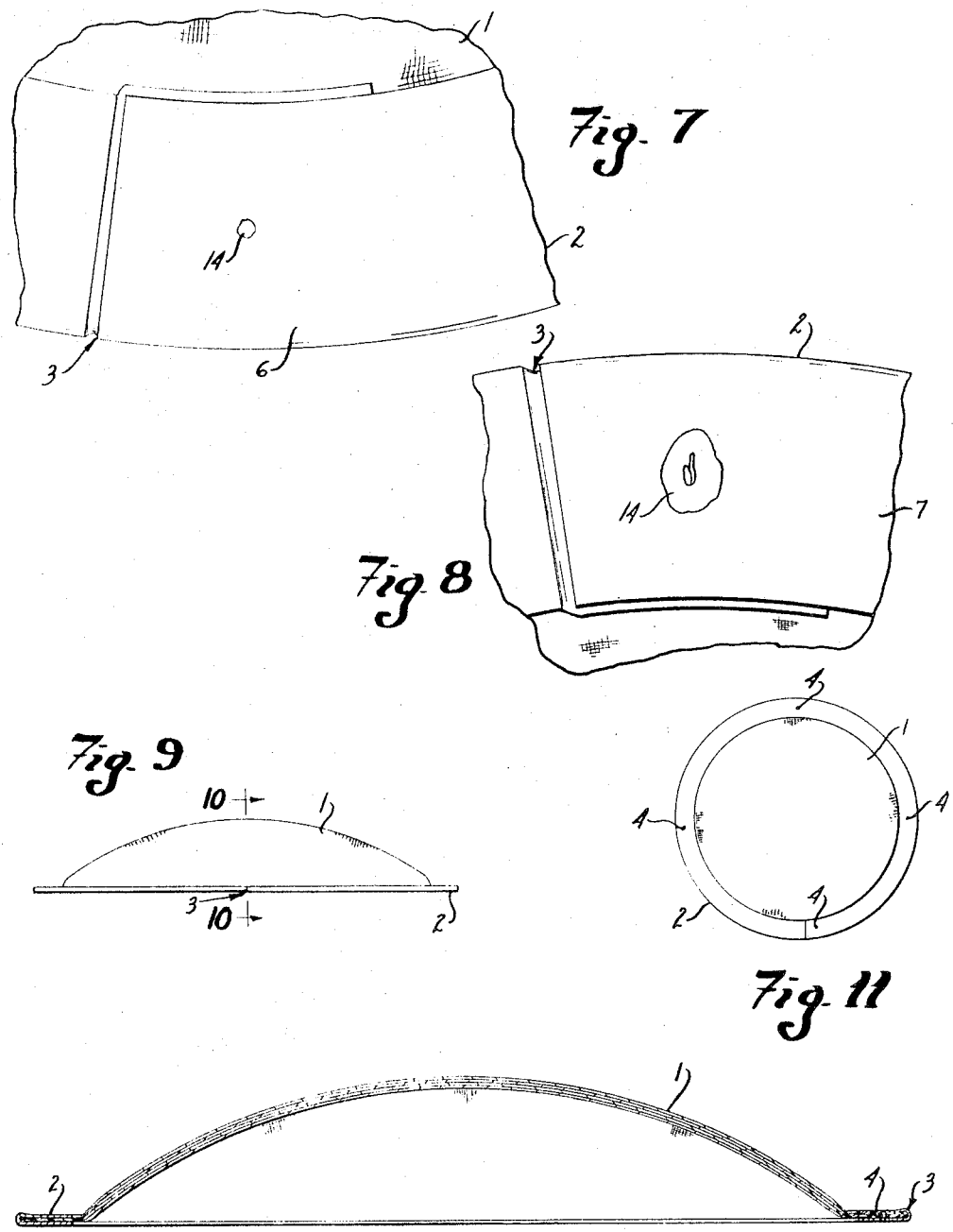

United States Patent Office 3,300,952
Patented Jan. 31, 1967

3,300,952
AIR FILTER HAVING DUCTILE METAL FRAME WITH INTEGRAL LOCK
Robert J. Cuta, Madison, Wis., assignor to Research Products Corporation, Madison, Wis., a corporation of Wisconsin
Original application July 13, 1962, Ser. No. 209,679, now Patent No. 3,252,213, dated May 24, 1966. Divided and this application Sept. 22, 1965, Ser. No. 489,163
2 Claims. (Cl. 55—491)

This application is a division of copending application, Serial No. 209,679, filed July 13, 1962, now Patent No. 3,252,213.

This invention relates to forming and joining ductile metal members used as supporting frames for filters and the like.

In the art of manufacturing lightweight air filters comprising one or more layers of filter material, it is often desirable to provide a frame for the edge thereof. The frame serves to provide a support for installation of the filter, and in the case of multiple filter layers it may also assist in holding the layers together.

Heretofore, filter frames have taken many forms. In some instances the filter edges have been gathered and then compressed to form an integral frame, such as in Hambrecht et al. Patent No. 3,017,698, assigned to a common assignee. In another example, the filter edges are initially compressed and a plastic material then permeated therethrough, as disclosed in the copending application of John M. Liebmann, Serial No. 81,842, filed January 10, 1961, now abandoned, and assigned to a common assignee.

In connection with the present invention, a single or multiple layer filter or the like is provided with a peripheral frame of generally U-shaped section. The frame is constructed of lightweight ductile metal, such as aluminum, and the ends thereof are overlapped to provide continuous envelopment of the filter edge which is disposed between the legs of the frame. The frame legs are in open position for placing around the filter, and are then compressed to hold the filter in place.

Problems have arisen when the frame was compressed over the filter edge. Stresses rolled into the frame in its initial formation caused the overlapping end sections to open or spring apart, thus destroying the functional and aesthetic aspects thereof.

The present invention solves the aforementioned problem and provides a structure wherein the legs of the overlapped frame ends, together with the filter material, are intermingled and merged into a lock which permanently holds the frame ends together.

In accordance with one aspect of the manufacture of the structure of the invention, one end of the frame is swaged and the other end overlapped thereover in assembling the frame to the filter media so that mating flanges are joined to present a smooth surface. A punch is then driven down through the frame and filter layers in the overlapped portion and in such a manner as to pyramid all the layers and draw them down below the plane of the frame. The drawn portion is then compressed to return same completely into said plane, and so that all of the layers are crushed and intermingled indiscriminately to positively lock the assembly together.

The accompanying drawings illustrate the best mode presently contemplated by the inventor for carrying out the invention.

In the drawings:

FIG. 7 is an enlarged top plan view of the lock area;

FIG. 8 is an enlarged bottom plan view of the lock area;

FIG. 9 is a side edge view of the completed filter;

FIG. 10 is a section taken on line 10—10 of FIG. 9; and

FIG. 11 is a top plan view of another embodiment of the invention.

Figure 1:
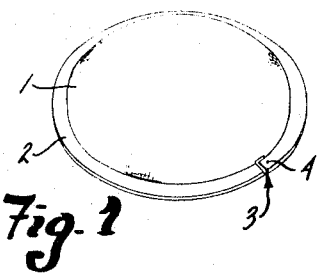
FIGURE 1 is a perspective view of a framed dome-shaped filter constructed in accordance with the invention.

As shown in FIGURE 1 of the drawings, the invention may be used in manufacturing an air filter comprising a domed filter body 1 of lightweight single or multilayer construction, the edges of which are enclosed or enveloped by a generally U-shaped rim or frame 2. Frame 2 is overlapped at its ends, as at 3, and a lock 4 securely holds the multi-layer assembly together.

Filter body 1 may be constructed of any suitable media which is crushable and relatively flexible. Slit and expanded sheets of aluminum foil, steel, copper and even cellulosic or plastic materials are quite satisfactory, depending upon the purpose for which the filter is to be used. Chain stitched or knitted materials made from aluminum or copper wire may also be suitable, as well as resin bonded fiber glass or flexible foam supported by wire mesh. Although the filter body is shown as domed and circular, other shapes such as flat and rectangular may also be utilized without departing from the spirit of the invention.

Body 1 is shown of multiple layer construction and of substantial thickness. In such case, the layers may be secured together by sewing, chemical bonding or the like and also at the edges by the lock of the invention.

The edges of body 1 are preferably partially compacted or crushed, as at 5 (FIG. 3) prior to assembly of frame 2 thereover.

Frame 2 is constructed of light gauge ductile metal such as aluminum, and which is capable of being easily drawn, as will be described.

Figure 3:
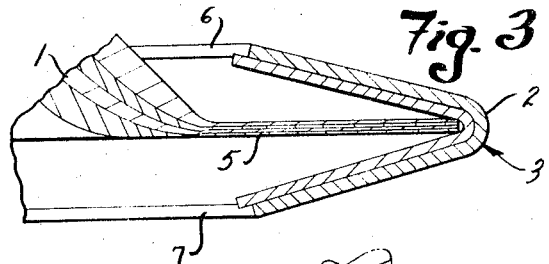
FIG. 3 is an enlarged section taken on line 3—3 of FIG. 2.
Figure 2:
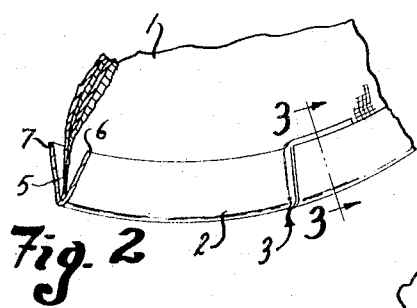
FIG. 2 is an enlarged fragmentary perspective view of a frame assembled to a filter prior to formation of the lock.

As best shown in FIGS. 2 and 3, frame 2 is initially formed to conform to the defined peripheral edge contour of body 1, and is placed about the edge so that the latter is disposed between the slightly spread frame legs 6 and 7, the latter being jointed along one edge. One end of frame 2 is swaged slightly so that the other end may overlappingly telescope thereover, as at 3, so that the frame tightly envelopes the edge.

In accordance with the embodiment of the invention shown, the overlapping frame ends are locked together with filter body 1 sandwiched therebetween. For this purpose, the initial assembly is placed on a flat surface 8 with portion 3 disposed over an opening 9. See FIG. 4. A piercing tool 10 is then brought down and pierces a hole through a limited area of the sandwich.

It has been found that the tool 10 should preferably be a pointed or tapered shaft, such as an awl. Wedges or four sided points tend to shear the metal, which is not desirable. However, if high speed piercing is used, such as with explosively driven nails, the point of the tool may have a different configuration.

Movement of tool 10 downwardly pierces and draws the metal of frame 2, as well as the edge of filter body 1, downwardly through a common hole and into opening 9 and beneath the plane of frame 2. The word "plane" is meant to identify the space between the outer surfaces of legs 6 and 7. The action actually produces an opening with a plurality of slightly tapered concentric pyramidal collars which correspond to the frame and crushed filter layers and which maintain their separate status at this point.

Figure 4:
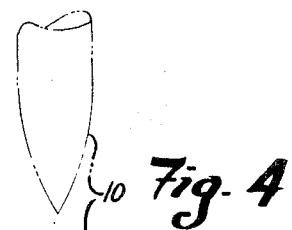
FIG. 4 is a section similar to FIG. 3 and showing the piercing operation.

As shown in FIG. 4, the piercing operation produces a lip or projection 11 which is drawn out of the general plane of the frame. Projection 11 is generally frustroconical and has a base which is about three to four times larger in diameter than the outer pierced extremity through which the narrow point of tool 10 penetrates. The diameter of the base of projection 11 is also the diameter of opening 9.

The existance and size of projection 11 will depend on variables such as punch shape and speed, and ductility of the frame.

The upper layers of the sandwich assembly are drawn farther than the lower layers so that substantially all of the layers are below the plane of the frame and form ragged flanges.

Figure 6:
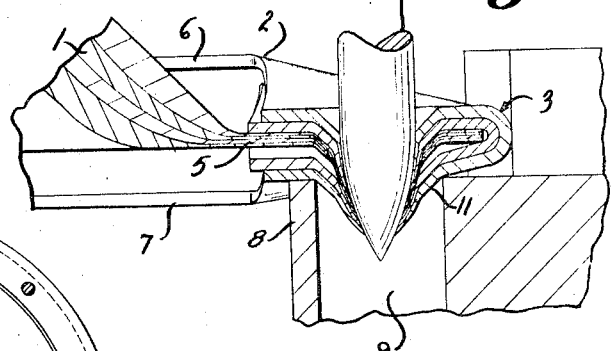
FIG. 6 is a plan view of the entire filter and also showing the compressing operation.
Figure 6:
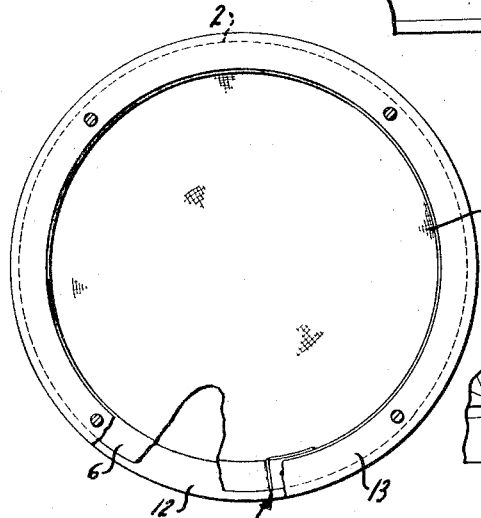
Figure 5:
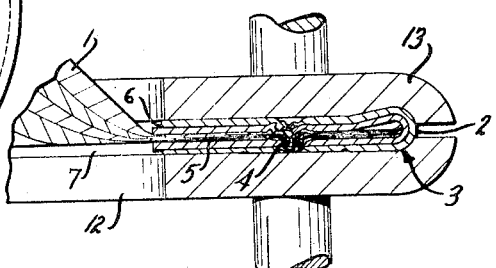
FIG. 5 is a section similar to FIG. 3 and showing the compressing operation.

Subsequently, tool 10 is removed and the pierced pyramid is returned to the original plane of the frame to form the final lock, and the legs of the remaining frame portion are pressed together to compact the filter edge therebetween. These operations may be done separately or simultaneously. FIGS. 5 and 6 show a simultaneous operation.

For this purpose, a compaction die is provided having an annular lower die member 12 and a similar upper die member 13 connected in any suitable manner to a source of high pressure. Hydraulic and mechanical rams of well-known construction have been found to be entirely satisfactory.

When the pierced sandwich assembly is compressed between die members 12 and 13, legs 6 and 7 are closed onto the filter edge and brought into parallel relation with each other. At the same time, the pyramided concentric collars crumple and are forced back up into the pierced hole in a non-uniform manner to cause crushing and random intermingling of the various layers so that they are completely indistinguishable and locked together. The shape and orientation of lip 11 assure that collars 10 return into the pierced hole, rather than crumpling against the frame around the hole.

FIGS. 7–10 show the construction of the final product wherein the pierced hole is removed and substantially no trace of the lock is in evidence, other than slight pock marks 14 on the frame surface. Projection 11 is also removed. The lock area is thus imperforate.

The hole is substantially completely filled in when malleable metals such as aluminum and lead are used in the sandwich and proper tonnage die pressure is used. This is desirable if it is wished to completely mask the lock. Use of .016"–.040" gauge aluminum construction and 10–40 tons compression will provide this result. When harder, less ductile materials are used, higher tonnage pressures or temperatures may be necessary to obtain the proper intermingling flow of layers back into the hole to close it.

The invention provides permanent anchoring of a lock joint, with or without a filter body integrally sandwiched inbetween. The material expense is substantially less than with unsightly riveting or welding.

In some instances, it may be desirable to utilize the lock to secure the filter media to the frame at a plurality of selected points about the periphery of the assembly. FIG. 11 shows such a construction. In this case one of the locks 4 is in the area of the overlapping frame ends and the other locks are spaced therefrom. In creating this embodiment, all of the locks 4 may be formed simultaneously or separately.

When both the filter body 1 and frame 2 are of aluminum, the entire assembly is well suited for anodizing or alodizing, since the lock requires no foreign metals which would contaminate an anodizing or alodizing bath.

While the method has been described in relation to a filter and filter frame, it can be applied to certain other structures without departing from the spirit of the invention.

Various modes of carrying out the invention are contemplated as being within the scope of the following claims and particularly pointing out and distinctly claiming the subject matter which is regarded as the invention.

I claim:
1. An air filter comprising:
 (a) a crushable filter body of substantial thickness having a defined partially compacted peripheral edge,
 (b) a ductile generally planular metal frame disposed over the edge of said filter body and with said frame comprising a pair of generally parallel legs joined along one edge,
 (c) the ends of said frame being overlapped,
 (d) and a lock integral with said overlapped ends and said filter body for holding the said ends together,
 (e) said lock comprising a predetermined limited substantially imperforate area wherein the layers formed by said overlapped ends of said frame and of said filter body are intermingled indiscriminately at random in the plane of the frame.

2. An air filter comprising:
 (a) a crushable filter body of substantial thickness having a defined partially compacted peripheral edge,
 (b) a ductile generally planular metal frame disposed over an edge of said filter body and with said frame comprising a pair of generally parallel legs joined along one edge,
 (c) and lock means joining the legs of said frame with the edge portion of said filter body,
 (d) said lock means comprising at least one predetermined limited substantially imperforate area wherein the said legs and the said filter body are crumpled together indiscriminately and randomly intermingle in the plane of the frame.

References Cited by the Examiner
UNITED STATES PATENTS

| | | | |
|---|---|---|---|
| 1,171,184 | 2/1916 | Feierabend | 160—381 X |
| 1,324,950 | 12/1919 | Zrebiec | 160—398 |
| 1,790,504 | 1/1931 | Jackson | 160—374 X |
| 1,801,949 | 4/1931 | Broudy et al. | 55—504 X |
| 2,122,557 | 7/1938 | Canter. | |
| 2,457,343 | 12/1948 | Braunschweiger | 160—404 X |
| 2,466,385 | 4/1949 | Coleman | 160—398 |
| 2,886,481 | 5/1959 | Swan. | |
| 3,017,698 | 1/1962 | Hambrecht et al. | |
| 3,084,609 | 4/1963 | Onstad. | |

WILLIAM B. KNIGHT, *Primary Examiner.*
ROBERT F. BURNETT, *Examiner.*